(No Model.)

W. H. CUTBIRTH & J. SUMMERS.
WHIFFLETREE HOOK.

No. 409,174. Patented Aug. 20, 1889.

Witnesses.
A. Ruppert.
Wm Burris

Inventors.
Wm. H. Cutbirth
Jacob Summers
Per
Thomas P. Simpson

UNITED STATES PATENT OFFICE.

WILLIAM H. CUTBIRTH AND JACOB SUMMERS, OF HOLLANDSBURG, INDIANA.

WHIFFLETREE-HOOK.

SPECIFICATION forming part of Letters Patent No. 409,174, dated August 20, 1889.

Application filed May 25, 1889. Serial No. 312,107. (No model.)

*To all whom it may concern:*

Be it known that we, WILLIAM H. CUTBIRTH and JACOB SUMMERS, citizens of the United States, residing at Hollandsburg, in the county of Parke and State of Indiana, have invented certain new and useful Improvements in Whiffletree-Hooks; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to that class of whiffletree-hooks which are provided with springs to hold them yieldingly, so that horses may start more readily, and so that sudden jars may be taken up.

Figure 1:
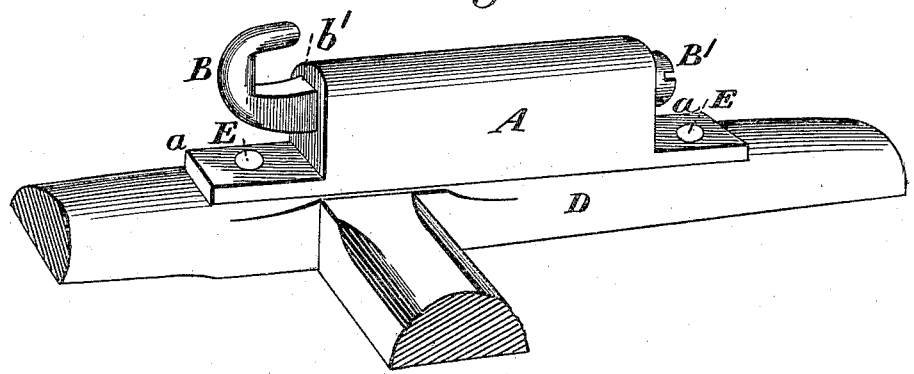
Figure 2:
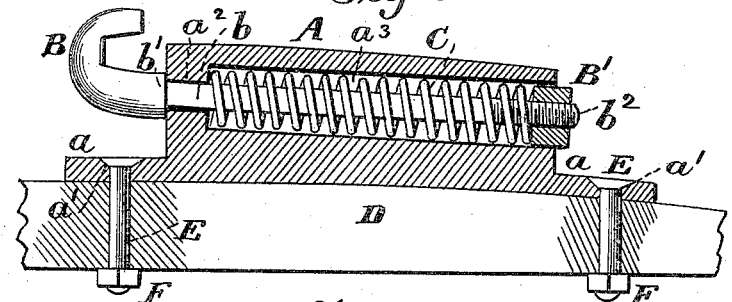
Figure 3:
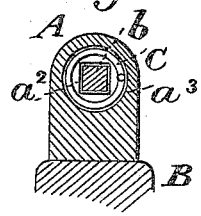
Figure 4:
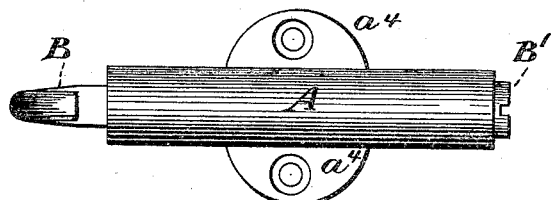

Figure 1 of the drawings is a perspective view of our invention applied; Fig. 2, a vertical longitudinal section; Fig. 3, a vertical cross-section, and Fig. 4 a modification which enables it to be applied directly to a doubletree and dispense with the singletrees.

In the drawings, A represents the metallic case, in which the hook B is yieldingly held by a spring C. This case has the integral end flanges $a\ a$, with holes $a'\ a'$, so that the said case may be detachably fastened to the shaft D by means of the screw-bolts E E, which pass through the shaft and receive the nuts F F. The construction of the case is peculiar in being provided with a square hole $a^2$ to receive squared shank $b$ of the hook B, and the larger round hole $a^3$ to receive the round nut B′, which is nicked to receive a bifurcated wrench from the outside. The spring G is coiled around the shank $b$ between the shoulders $b'$ and the round nut B′, which works on the end thread $b^2$. The round form of the nut allows it to be turned in the hole $a^3$. By this construction the hook may be securely fastened in four different positions, so as to be used equally well on the top, bottom, or sides, while by the addition of case-flanges $a^4$ it may be fastened directly to a doubletree, where two horses are employed, dispensing entirely with the singletrees.

We are acquainted with the draft spring-hook described in Patents No. 367,183 and 353,942; but they cannot be used like ours, nor are they so convenient or so durable.

What we claim as new, and desire to protect by Letters Patent, is—

A spring draft-hook for vehicles, having the square shank $b$ and round nut B′ on its threaded end, the straight barreled case A, in which said shank and nut fit, and perforated end flanges $a\ a$ in line with said barrel, whereby screw-caps at the ends are dispensed with, and the hook may be applied on the right or left on the inside of shafts, as described.

In testimony whereof we affix our signatures in presence of two witnesses.

WILLIAM H. CUTBIRTH.
JACOB SUMMERS.

Witnesses:
CHARLIE H. HOCKER,
CHAS. H. COLLINGS.